United States Patent [19]

Nitz et al.

[11] Patent Number: 5,086,670
[45] Date of Patent: Feb. 11, 1992

[54] ADAPTIVE TRANSMISSION SHIFT PRESSURE CONTROL WITH CLOSED-LOOP COMPENSATION

[75] Inventors: Larry T. Nitz, Troy; Rimas S. Milunas, Royal Oak, both of Mich.

[73] Assignee: Saturn Corporation, Troy, Mich.

[21] Appl. No.: 722,770

[22] Filed: Jul. 31, 1991

[51] Int. Cl.[5] ............................................. B60K 41/06
[52] U.S. Cl. ..................................... 74/866; 364/424.1
[58] Field of Search ......................... 74/866; 364/424.1

[56] References Cited

U.S. PATENT DOCUMENTS

| | | | |
|---|---|---|---|
| 4,283,970 | 8/1981 | Vukovich | 74/866 |
| 4,653,350 | 3/1987 | Downs et al. | 74/864 |
| 5,014,573 | 5/1991 | Hunter et al. | 74/866 O |
| 5,036,729 | 8/1991 | Nitz et al. | 74/866 O |
| 5,038,636 | 8/1991 | Vukovich et al. | 74/866 O |
| 5,046,174 | 9/1991 | Lentz et al. | 74/866 X |
| 5,046,178 | 9/1991 | Hibner et al. | 74/866.6 X |

Primary Examiner—Leslie A. Braun
Assistant Examiner—Daniel Wittels
Attorney, Agent, or Firm—Mark A. Navarre

[57] ABSTRACT

An adaptive transmission pressure control based on a measured interval of speed ratio progression includes a closed-loop control which compensates for factors that tend to extend the speed ratio progression. The control detects the rate of speed ratio progression during a first portion of the inertia phase of the shift, and employs closed-loop pressure control to maintain the detected rate of progression through completion of the shift. This ensures that the measured progression interval will accurately reflect the relationship between the scheduled pressure and the resulting shift ratio progression, regardless of factors which would otherwise influence the measured shift progression interval. Consequently, the correlation between shift quality and the measured shift progression interval is preserved.

3 Claims, 12 Drawing Sheets

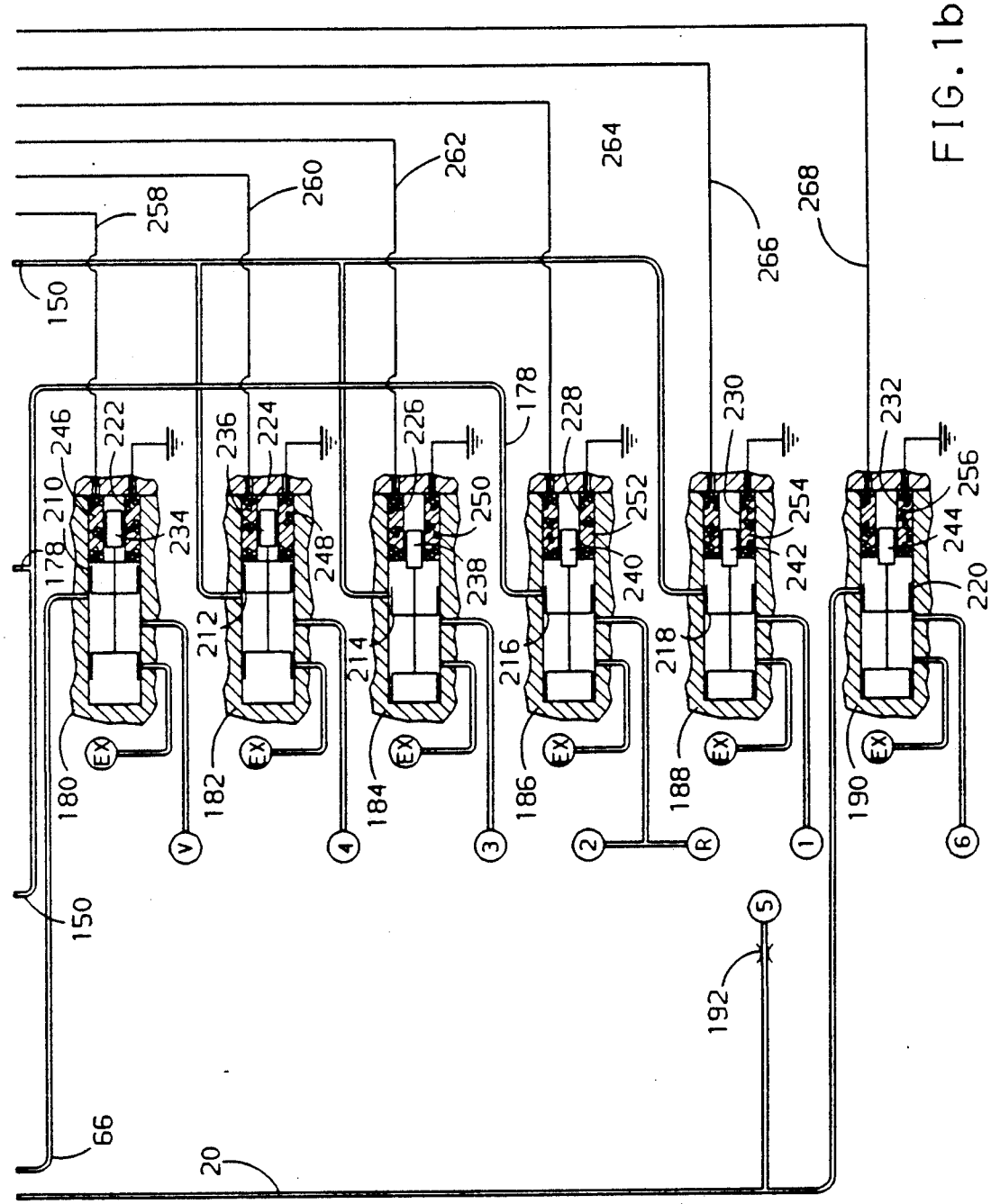

5,086,670

ADAPTIVE TRANSMISSION SHIFT PRESSURE CONTROL WITH CLOSED-LOOP COMPENSATION

This invention relates to an electronic pressure control for an automatic shift transmission, and more particularly, to a method of adaptively correcting an open-loop pressure schedule.

BACKGROUND OF THE INVENTION

Shifting between speed ratios in an automatic v transmission involves an exchange of on-coming and off-going fluid operated friction elements and is generally characterized as comprising three successive phases: a fill phase, a torque phase and an inertia phase. In the fill phase, the on-coming element is prepared for torque transmission; in the torque phase, the torque exchange occurs without a corresponding speed change; and in the inertia phase, the speed change occurs.

In shift controls based on an open-loop control philosophy, the fluid pressure supplied to the on-coming element during the torque and inertia phases is progressively increased in accordance with a predetermined pressure schedule. The pressure values are calibrated to achieve optimum shift quality in a nominal vehicle, but vehicle-to-vehicle variability and performance variations which occur over time may adversely affect the shift quality actually achieved. For this reason, adaptive control techniques have been employed to adjust the predetermined pressure schedule, based on a measure of the deviation of the actual shift quality from the desired or optimum shift quality. An example of such a control is set forth in the U.S. Pat. No. to Downs et al. 4,653,350, issued March 31, 1987, and assigned to General Motors Corporation. According to that control, the predetermined pressure schedule is adjusted in accordance with the deviation between a measure of the time interval required for the speed ratio to occur and a reference interval representative of optimum shift quality.

A complicating phenomenon experienced with the above-described control is that certain factors unrelated to pressure scheduling tend to extend the latter portion of the speed ratio progression, especially as the shift nears completion. The principle factor, especially in high torque upshifts, is the increase in input torque as the engine is decelerated from its pre-shift speed to its post-shift speed. Other factors, such as the removal of engine torque reduction controls, also extend the latter portion of the speed ratio progression. While these factors do not significantly degrade the shift quality per se, they tend to increase the time interval measured by the adaptive control, thereby resulting in unwarranted adaptive adjustment to the predetermined pressure schedule.

SUMMARY OF THE INVENTION

The present invention is directed to an improved adaptive pressure control based on a measured interval of speed ratio progression, including a closed-loop control which compensates for factors that tend to extend the latter portion of the speed ratio progression, thereby substantially eliminating the effect of such factors on the resulting adaptive adjustment.

The control of this invention is carried out with a supplemental control routine which detects the rate of speed ratio progression during a first portion of the inertia phase of the shift, and employs a closed-loop pressure control to maintain the detected rate of progression through completion of the shift. Since the speed ratio progression in the first portion of the inertia phase is predominantly pressure dependent, maintaining that rate throughout the remainder of the inertia phase ensures that the measured progression interval will accurately reflect the relationship between the scheduled pressure and the resulting shift ratio progression, regardless of factors which would otherwise influence the measured shift progression interval. Consequently, the presence of such factors does not result in adaptive adjustment of the predetermined pressure schedule, and the correlation between shift quality and the measured shift progression interval is preserved.

BRIEF DESCRIPTION OF THE DRAWINGS

FIGURES schematically depict a computer-based electronic transmission control system controlled to this invention.

FIG. 5 depicts an instance in which the latter portion of the ratio progression is extended, while

DETAILED DESCRIPTION OF THE DRAWINGS

Figure 1A:
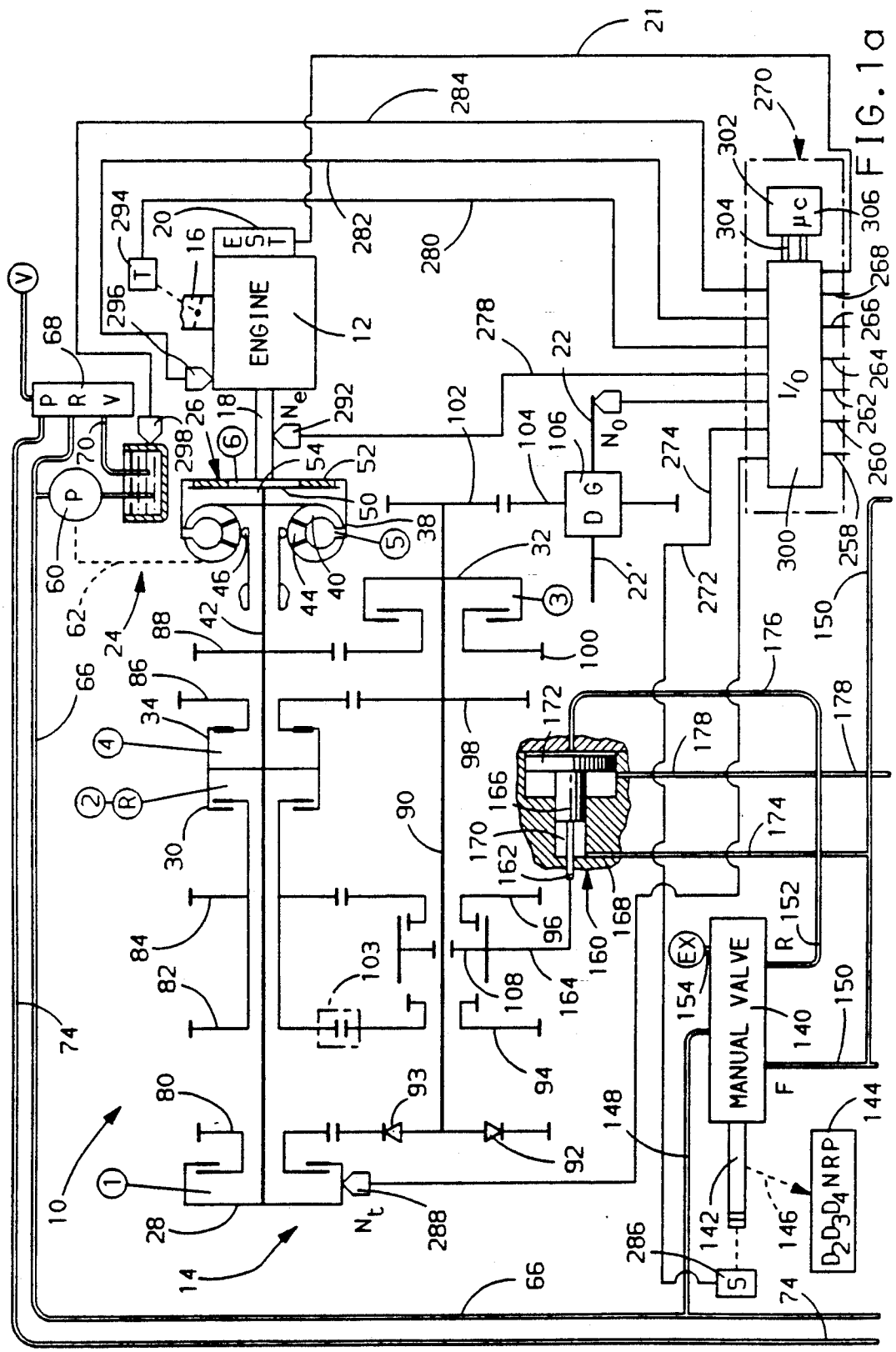

Referring particularly to FIGS. 1a and 1b, the reference numeral 10 generally designates a motor vehicle drivetrain including a spark ignition internal combustion engine 12 and a parallel shaft transmission 14 having a reverse speed ratio and four forward speed ratios. Engine 12 includes a throttle mechanism 16 mechanically connected to an operator manipulated device, such as an accelerator pedal (not shown) for regulating engine output torque, such torque being applied to the transmission 14 through the engine output shaft 18.

The engine ignition function is carried out with a conventional spark ignition system (not shown) which cooperates with a conventional electronic spark timing (EST) unit 20 to initiate combustion in the various engine cylinders in accordance with a predetermined schedule. The EST unit 20 typically schedules the spark timing as a predetermined function of engine speed and load, and modifies the scheduled timing value in accordance with spark retard commands, if any, present on line 21.

The transmission 14 transmits engine output torque to a pair of drive axles 22, 22' through a torque converter 24 and one or more of the fluid operated clutching devices 26-34, such clutching devices being applied or released according to a predetermined schedule for establishing the desired transmission speed ratio. The impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14.

The torque converter 24 also includes a clutching device 26 comprising a clutch plate 50 secured to the shaft 42. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38 as shown in FIG. 1a, thereby engaging the clutching device 26 to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36, as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in the U.S. Pat. No. to Schuster 4,342,545 issued Aug. 3, 1982, and a representative pressure regulator valve is disclosed in the U.S. Pat. No. to Vukovich 4,283,970 issued Aug. 18, 1981, such patents being assigned to General Motors Corporation.

The transmission shaft 42 and a further transmission shaft 90 each have a plurality of gear elements rotatably supported thereon. The gear elements 80-88 are supported on shaft 42 and the gear elements 92-102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28-34 each comprise an input member rigidly connected to a transmission shaft 42 or 90, and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28-34 is biased toward a disengaged state by a return spring (not shown).

Engagement of the clutching device is effected by supplying fluid pressure to an apply chamber thereof. The resulting torque capacity of the clutching device is a function of the applied pressure less the return spring pressure, hereinafter referred to as the working pressure pressure. The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80-88 and 92-100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28-34 in a released condition. The speed ratios defined by the various gear element pairs are generally characterized by the ratio of the turbine speed $N_t$ to output speed $N_o$. Representative $N_t/N_o$ ratios for transmission 14 are as follows:

| First - 2.368 | Second - 1.273 |
|---|---|
| Third - 0.808 | Fourth - 0.585 |
| Reverse - 1.880 | |

Shifting from a current foward spaced ratio to a desired forward speed ratio requires that the clutching device associated with the current speed ratio (off-going) be disengaged, and the clutching device associated with the desired speed ratio (on-coming) be engaged. For example, a shift from the first forward speed ratio to the second forward speed ratio involves disengagement of the clutching device 28 and engagement of the clutching device 30.

The fluid control elements of the transmission 14 include a manual valve 140, a directional servo 160 and a plurality of electrically operated fluid valves 180-190. The manual valve 140 operates in response to operator demand and serves, in conjunction with directional servo 160, to direct regulated line pressure to the appropriate fluid valves 182-188. The fluid valves 182-188, in turn, are individually controlled to direct fluid pressure to the clutching devices 28-34. The fluid valve 180 is controlled to direct fluid pressure from the pump output line 66 to the pressure regulator valve 68, and the fluid valve 190 is controlled to direct fluid pressure from the line 74 to the clutching device 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148, and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3 or D2 positions shown on the indicator mechanism 144, line pressure from the line 148 is directed to the forward (F) output line 150.

When the shaft 142 is in the R position shown on the indicator mechanism 144, line pressure from the line 148 is directed to the reverse (R) output line 152. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172.

When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1 to engage dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180-190 each receive fluid pressure at an input passage thereof from the pump 60, and are individually controlled to direct fluid pressure to the pressure regulator valve 68 or respective clutching devices 26-34. The fluid valve 180 receives line pressure directly from pump output line 66, and is controlled to direct a variable amount of such pressure to the pressure regulator valve 68, as indicated by the circled letter V. The fluid valves 182, 186 and 188 receive fluid pressure from the forward output line 150 of manual valve 140, and are controlled to direct variable amounts of such pressure to the clutching devices 34, 32 and 28, as indicated by the circled numerals 4, 3 and 1, respectively.

The fluid valve 186 receives fluid pressure from the forward output line 150 and the directional servo output line 178, and is controlled to direct a variable amount of such pressure to the clutching device 30, as indicated by the circled numeral 2 and the circled letter R. The fluid valve 190 receives fluid pressure from line 74 of pressure regulator valve 68, and is controlled to direct a variable amount of such pressure to the release chamber 56 of the clutching device 26, as indicated by the circled numeral 6. The apply chamber 54 of the clutching device 26 is supplied with fluid pressure from the output line 74 via the orifice 192, as indicated by the circled numeral 5.

Each of the fluid valves 180-190 includes a spool element 210-220, axially movable within the respective valve body for directing fluid flow between input and output passages. When a respective spool element 210-220 is in the rightmost position as viewed in FIG. 1, the input and output passages are connected. Each of the fluid valves 180-190 includes an exhaust passage, as indicated by the circled letters EX, such passage serving to drain fluid from the respective clutching device when the spool element is shifted to the leftmost position as viewed in FIG. 1.

In FIG. 1, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines. Each of the fluid valves 180-190 includes a solenoid 222-232 for controlling the position of its spool element 210-220. Each such solenoid 222-232 comprises a plunger 234-244 connected to the respective spool element 210-220 and a solenoid coil 246-256 surrounding the respective plunger. One terminal of each such solenoid coil 246-256 is connected to ground potential as shown, and the other terminal is connected to an output line 258-268 of a control unit 270 which governs the solenoid coil energization. As set forth hereinafter, the control unit 270 pulse-width-modulates the solenoid coils 246-256 according to a predetermined control algorithm to regulate the fluid pressure supplied to the pressure regulator 68 and the clutching devices 26-34, the duty cycle of such modulation being determined in relation to the desired magnitude of the supplied pressures.

While the fluid valves 180-190 have been illustrated as spool valves, other types of valves could be substituted therefor. By way of example, valves of the ball and seat type could be used. In general terms, the fluid valves 180-190 may be mechanized with any three-port pulse-width-modulated valving arrangement.

Input signals for the control unit 270 are provided on the input lines 272-285. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276 and 278, respectively. The speed transducer 288 senses the velocity of the transmission shaft 42 and therefore the turbine or transmission input speed Nt; the speed transducer 290 senses the velocity of the drive axle 22 and therefore the transmission output speed No; and the speed transducer 292 senses the velocity of the engine output shaft 18 and therefore the engine speed Ne.

The position transducer 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284.

The control unit 270 responds to the input signals on input lines 272-285 according to a predetermined control algorithm as set forth herein, for controlling the energization of the fluid valve solenoid coils 246-256 via output lines 258-268. As such, the control unit 270 includes an input/output (I/O) device 300 for receiving the input signals and outputting the various pulse-width-modulation signals, and a microcomputer 302 which communicates with the I/O device 300 via an address-and-control bus 304 and a bi-directional data bus 306. Flow diagrams representing suitable program instructions for developing the pulse-width-modulation outputs and carrying out the control of this invention are depicted in FIGS. 7-13.

As indicated above, every shift from one speed ratio to another involves disengagement of an off-going clutching device and engagement of an on-coming clutching device. Each shift includes a fill phase during which the apply chamber of the on-coming clutch is filled with fluid, a torque phase during which the engine torque is transferred from the off-going clutch to the on-coming clutch, and an inertia phase during which the speed change occurs.

According to this invention, the fluid pressure supplied to the on-coming clutch during the torque and inertia phases is scheduled in relation to an estimation of the gear set input torque Tv. The input torque Tv may be calculated as a function of the engine manifold absolute pressure (MAP), the engine pumping efficiency (K), a mechanical friction term (tf), the accessory load torque (TL), and the torque multiplication ratio (Tc) of the torque converter 24 according to the following expression:

$$Tv = [(MAP \times K) - tf - TL] \times Tc$$

The engine MAP is determined from the sensor 296, while the efficiency K is stored based on previously determined data. The mechanical friction term tf is determined as a function of engine speed, and the load torque term TL is estimated by loading indicators. The torque multiplication ratio Tc is determined as a function of the speed ratio Nt/Ne.

Figure 2:
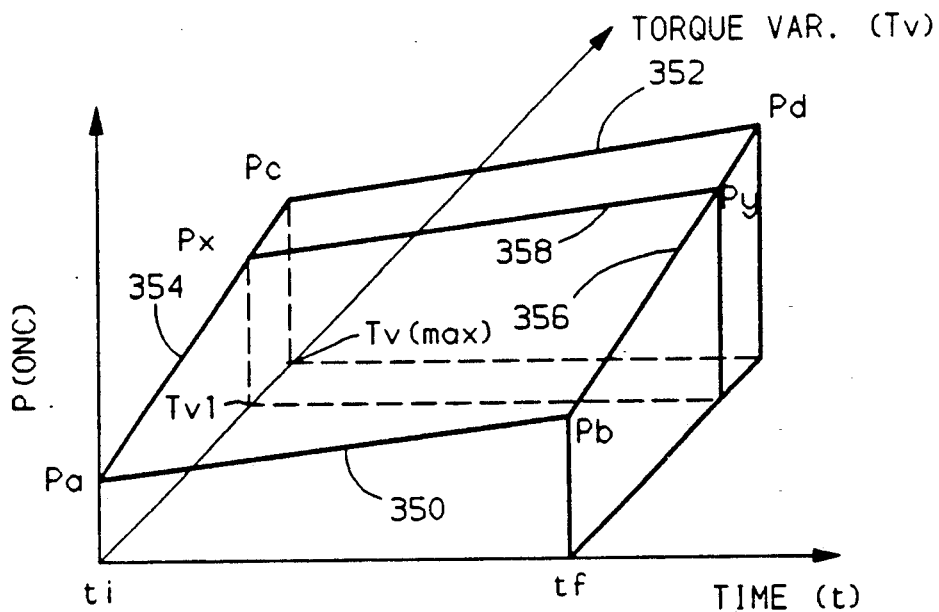
FIG. 2 graphically depicts a predetermined on-coming pressure schedule.

In practice, the desired pressure for the on-coming clutch is stored as a function of the torque variable Tv and time, as graphically depicted in FIG. 2. For any given value of torque variable Tv, the pressure vs. time schedule is defined by a pair of pressure endpoints, one such endpoint corresponding to an initial time ti, and the other corresponding to a final time tf. The time ti marks the beginning of the torque phase, and the time tf marks the end of the inertia phase. If the calculated torque variable Tv is zero or near-zero, for example, the pressure vs. time schedule is defined by the line 350 connecting the pressure endpoints Pa and Pb. If the calculated torque variable Tv is very high, as designated by Tv(max), the pressure vs. time schedule is defined by the line 352 connecting the pressure endpoints Pc and Pd.

In practice, only the four pressure endpoints Pa, Pb, Pc, and Pd need be stored by the control unit 270. For any calculated torque variable value Tvl between zero and Tv(max), the initial pressure Px is linearly interpolated along the line 354 connecting the initial pressure endpoints Pa and Pc, and the final pressure Py is linearly interpolated along the line 356 connecting the final pressure endpoints Pb and Pd. In such case, the pressure vs. time schedule for the shift would be defined by the line 358 connecting the initial and final pressures Px and Py. The time (tf-ti) for a given shift is empirically derived and stored in the memory of control unit 270.

When the on-coming clutch pressure properly scheduled, and the various control elements each function as expected, the ratio shift will progress in a desired manner with neither excessive harshness nor excessive slippage of the friction devices. As indicated above, however, a certain amount of variation in the engine and transmission operating characteristics can be expected over the life of the vehicle due to wear. Moreover, there may be some vehicle-to-vehicle variability due to assembly and component tolerances. In these cases, the clutch pressure during the torque and inertia phases will be too high or too low for a given operating condition, and the shift quality may be degraded. When the scheduled pressure for the on-coming clutch is too high, the increased torque capacity shortens the inertia phase and produces a transient increase in the transmission output torque To. This may be perceived as an undesirably harsh shift. When the scheduled pressure for the on-coming clutching device is too low, the reduced torque capacity lengthens the inertia phase, degrading the shift quality and inducing excessive wear and heating of the clutches.

It is thus recognized that an adaptive compensation of the scheduled pressure is needed to correct for variations in system performance which affect the inertia phase torque. To this end, the predetermined pressure schedule of FIG. 2 is adaptively compensated by developing an adaptive pressure correction amount in relation to the comparison between a reference inertia phase interval Trip and a measure of the actual inertia phase interval tip. If the comparison indicates that tip is too long, the correction amount serves to increase the applied pressure in subsequent shifts to that ratio. If the comparison indicates that tip is too short, the correction amount serves to decrease the applied pressure in subsequent shifts to that ratio. A detailed description of how the adaptive correction amounts are determined and applied is set forth in the above-referenced Downs et al. patent.

As set forth in Downs et al., the actual inertia phase interval tip is determined in the course of each upshift by monitoring the speed ratio Nt/No. The initial and final ratios are known, and the control unit 270 continuously computes the percent of ratio completion, %RATCOMP. Algebraically, %RATCOMP is given by the expression:

$$\%RATCOMP = |RAT_{meas} - RAT_{old}|/|RAT_{new} - RAT_{old}|$$

where RATmeas is the actual ratio, RATold is the ratio of the previously engaged speed ratio, and RATnew is the ratio of the desired speed ratio.

Figure 3:
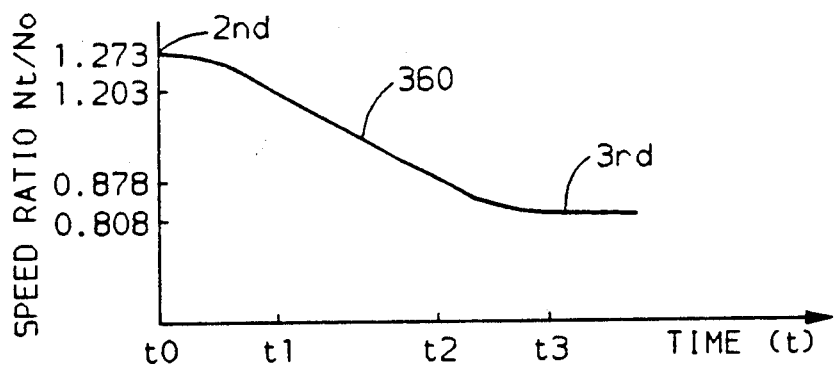
FIG. 3 graphically depicts the change in speed ratio occurring during the course of a 2-3 upshift.

The speed ratio progression for a typical 2-3 ratio shift is graphically represented by the trace 360 of FIG. 3. In such example, the ratio changes from the second speed ratio value of 1.273 RPM/RPM to the third speed ratio value of 0.808 RPM/RPM. Technically, the inertia phase of the shift begins at time t0 when the turbine speed (and hence, the ratio) begins to change, and ends at time t3 when the ratio reaches the third speed ratio value of 0.808 RPM/RPM. However, the initial and final nonlinearity of the trace makes measurement of the interval t0-t3 somewhat difficult. To obtain a more repeatable indication of the inertia phase interval tip and to permit reliable extrapolation of the available data, tip is defined as the interval between 15% and 85% of ratio completion. In the example of FIG. 3, the ratio change is 15% complete (1.203 RPM/RPM) at time t1 and 85% complete (0.878 RPM/RPM) at time t2.

In addition to the initial and final nonlinearities referred to above, certain factors unrelated to pressure scheduling tend to extend the latter portion of the speed ratio progression, especially as the shift nears completion. The principle factor, especially in high torque upshifts, is the increase in input torque as the engine is decelerated from its pre-shift speed to its post-shift speed.

Figure 4:
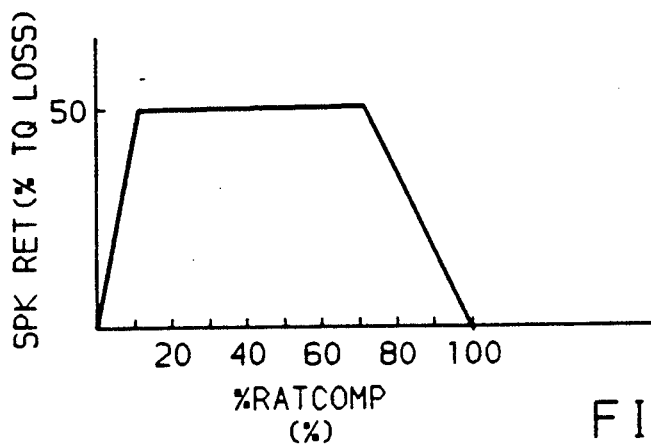
FIG. 4 graphically depicts a spark retard schedule employed during upshifting.

Another factor affecting the ratio progression during a shift is the removal of engine torque reduction controls during the shift. As indicated above, engine torque reduction controls, such as engine spark retard, are often employed during shifting to reduce the engine torque for improved durability. In the illustrated embodiment, torque reduction controls are employed in every upshift, and the scheduled on-coming pressure is calibrated to provide on-coming torque capacity which matches the reduced engine torque level. The amount of spark retard may be scheduled in relation to the speed ratio progression, as indicated in FIG. 4, which shows the percentage of engine torque loss as a function of the term %RATCOMP. The actual amount of spark retard, in turn, may be determined as a function of the percentage of engine torque loss, based on an empirically derived relationship therebetween. As described below with reference to FIGS. 5 and 6, the spark retard is initiated at the end of the fill phase for achieving an engine torque loss of approximately 50%. The spark retard is progressively removed in the latter portion of the shift progression, beginning when %RATCOMP reaches approximately 70%.

While the rise in engine torque in the latter portion of the speed ratio progression does not significantly degrade the shift quality per se, it tends to increase the inertia phase interval measured by the adaptive control, thereby resulting in unwarranted adaptive adjustment to the open-loop pressure schedule. This situation is graphically illustrated in Graphs A-E of FIG. 5 for a 2-3 upshift. Graph A depicts the on-coming pressure P(ONC), Graph B depicts the off-going pressure P(OFG), Graph C depicts the ratio progression term %RATCOMP, Graph D depicts the engine spark retard signal SPK RET, and Graph E depicts the turbine speed Nt, all on a common time base.

The upshift is initiated at time T0 by supplying fluid to the on-coming clutch at a high duty cycle DCmax for a predetermined fill time tfill. Upon completion of the fill period at time t1, the off-going clutch is rapidly released (Graph B) and the engine spark timing is retarded in an amount to produce an engine torque loss of approximately 50% (Graph D). Following a brief torque phase, the turbine speed Nt (Graph E) is progressively drawn toward the synchronous speed for the target ratio (2nd), designated by the broken trace 362. The turbine speed decrease is reflected in the term %RATCOMP, as indicated in Graph C. When the percent of ratio completion (%RATCOMP) reaches approximately 70% at time t2, the spark retard is progressively removed. This reserves an adequate amount of time for returning the spark timing to its normal value by the end of the shift.

Figure 5:
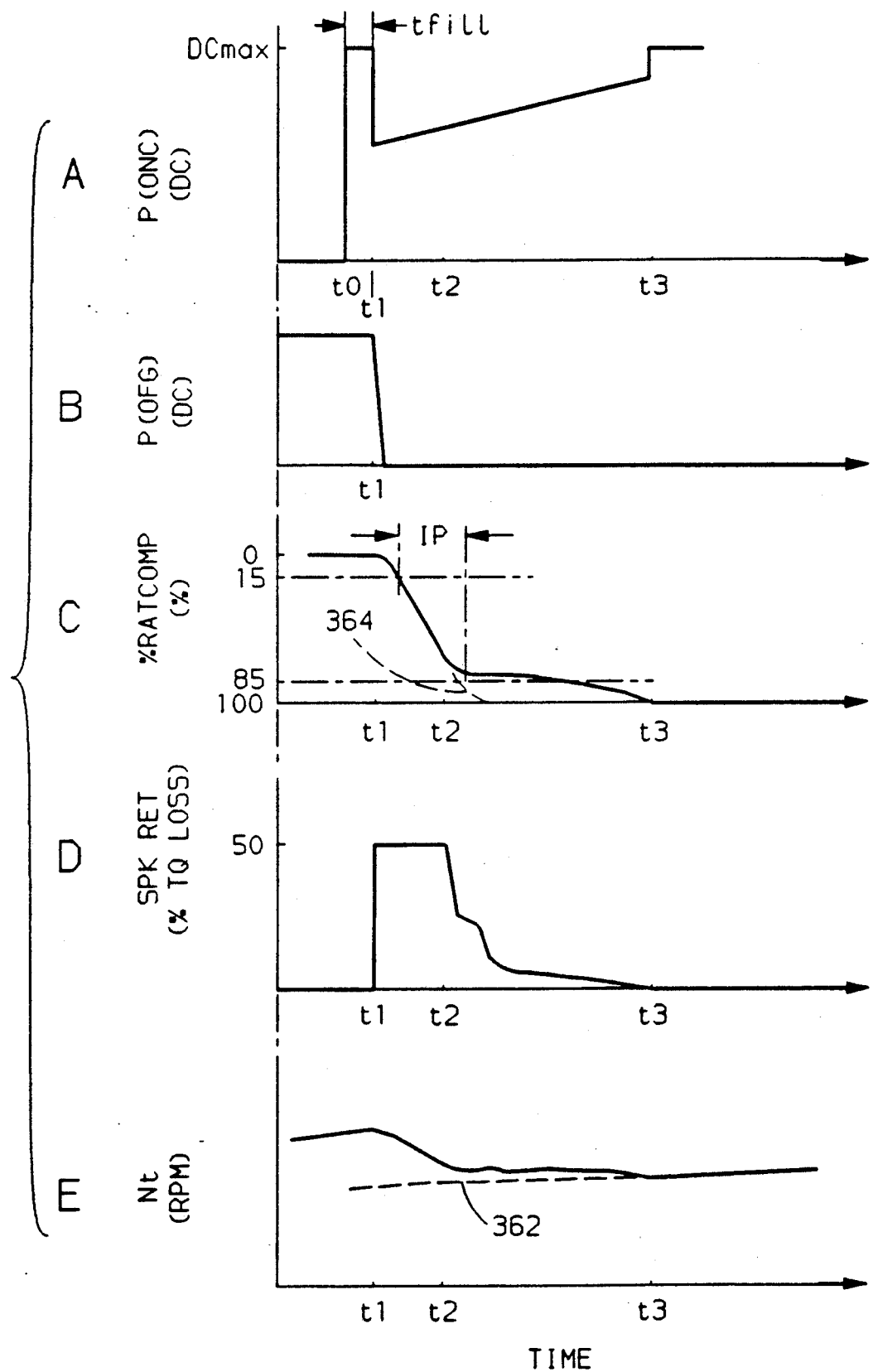
FIGS. 5 graphically depict various transmission and control parameters occurring in the course of an upshift.
Figure 6:
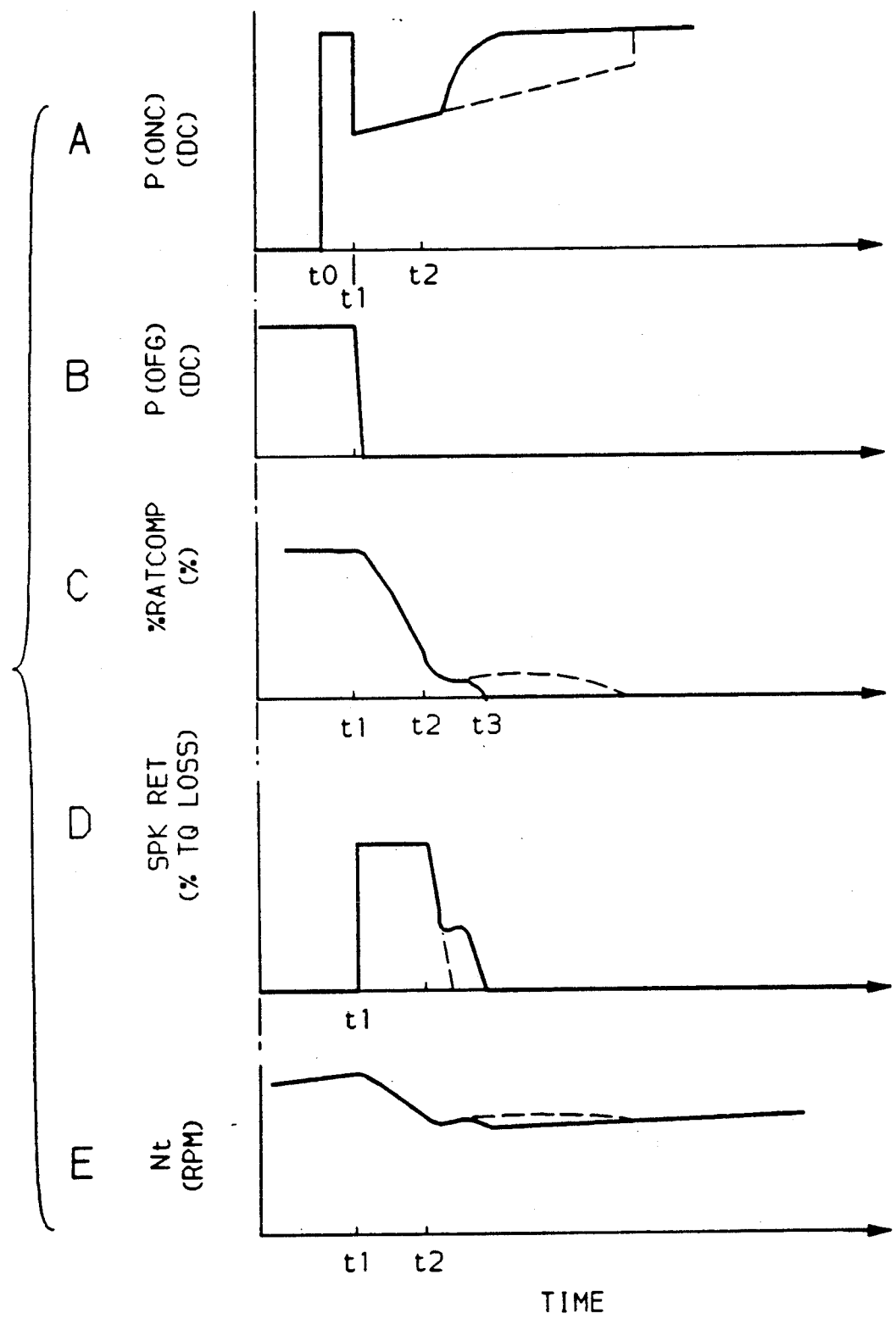
FIG. 6 illustrates how the control of this invention compensates for the ratio extension depicted in FIG. 5.

In the absence of any factors tending to extend the shift progression, the ratio completion term %RATCOMP would continue toward 100% as described above with reference to FIG. 3, and as designated in Graph C of FIG. 5 by the broken trace 364. This would result in a measured inertia phase (IP) interval— that is, %15<%RATCOMP>85%—substantially as indicated in Graph C. As indicated above, the adaptive control operates to compare the measured interval (IP) with a reference or desired inertia phase interval Trip for the purpose of forming an adaptive correction to the scheduled on-coming pressure for the next shift to the same ratio.

In this case, however, the increased engine torque due to the engine speed reduction and the removal of the spark retard decreases the rate of change in turbine speed, extending the shift progression, as noted in Graphs C and E in the interval t2-t3. Depending on operating conditions, the extension may be prolonged until the application of full line pressure to the on-coming clutch, as in the illustrated shift. Uncompensated, this phenomenon would increase the measured inertia phase interval IP, giving rise to a false indication of low on-coming pressure, and a consequent adaptive increase of the scheduled on-coming pressure for the next shift to the same ratio.

As indicated above, this situation is rectified, according to this invention, by detecting the rate of speed ratio progression during a first portion of the inertia phase of the shift, and effecting a closed-loop increase of the scheduled on-coming pressure to maintain the detected rate of progression through completion of the shift. This control is graphically illustrated in FIG. 6, where Graphs A-E correspond to Graphs A-E of FIG. 5. The shift proceeds as described above in relation to FIG. 5 until approximately time t2, where the increased engine torque decreases the rate of change in ratio progression.

In the initial portion of the ratio progression, the control unit 270 takes a running sample of the rate of change of the term %RATCOMP. Once the ratio progression is approximately 50% complete and a significant negative deviation from the sampled rate is detected, the control of this invention effects a closed-loop increase of the on-coming pressure, as seen in Graph A. The amount of the closed-loop increase is determined in relation to the magnitude of the deviation. In the illustrated shift, the on-coming pressure is increased to the maximum (line) pressure in an attempt to maintain the rate sampled in the initial portion of the inertia phase, resulting in the completion of the ratio progression at time t3. As in the example of FIG. 5, the spark retard tracks the changes in %RATCOMP due to the relationship described in reference to FIG. 4.

Since the speed ratio progression in the first portion of the inertia phase is primarily a function of the scheduled on-coming pressure, maintaining the detected rate throughout the remainder of the inertia phase ensures that the measured progression interval will accurately reflect the relationship between the scheduled pressure and the resulting shift ratio progression, regardless of factors which would otherwise influence the measured shift progression interval. Consequently, the presence of such factors does not result in adaptive adjustment of the predetermined pressure schedule, and the correlation between shift quality and the measured shift progression interval is maintained.

Figure 7:
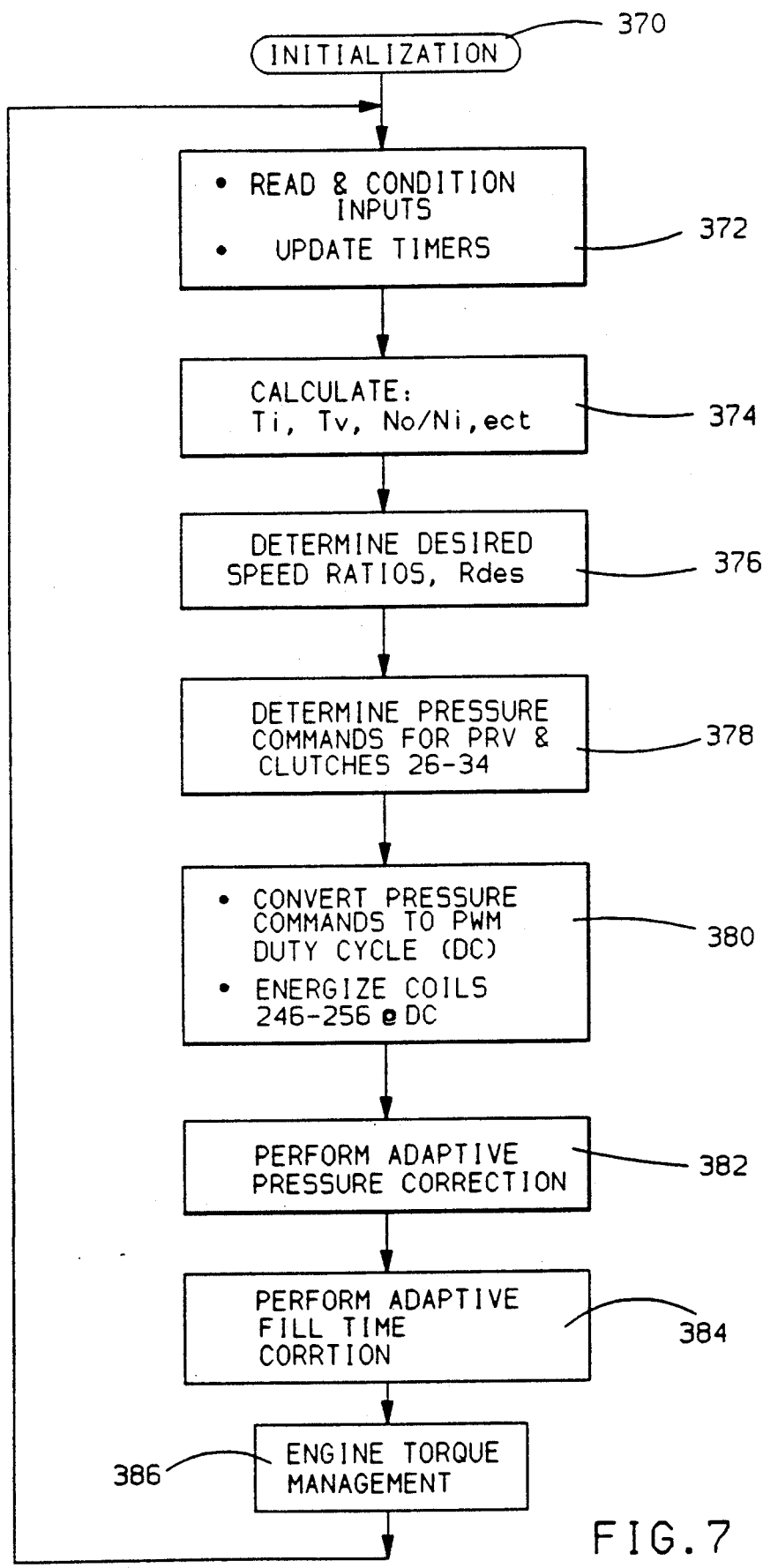
FIGS. 7-13 depict flow diagrams executed by the computer-based controller of FIG. 1a in carrying out the control of this invention.

The flow diagrams depicted in FIGS. 7-13 represent program instructions to be executed by the microcomputer 302 of control unit 270 in mechanizing ratio shifting and the adaptive control functions of this invention. The flow diagram of FIG. 7 represents a main or executive program which calls various subroutines for executing particular control functions as necessary. The flow diagrams of FIGS. 8-13 represent the functions performed by those subroutines which are pertinent to the present invention.

Referring now more particularly to FIG. 7, the reference numeral 370 designates a set of program instructions executed at the initiation of each period of vehicle operation for initializing the various tables, timers, etc., used in carrying out the control functions of this invention. Following such initialization, the instruction blocks 372-386 are repeatedly executed in sequence, as designated by the flow diagram lines connecting such instruction blocks. Instruction block 372 reads and conditions the various input signals applied to I/O device 300 via the lines 272-285, and updates (increments) the various control unit timers. Instruction block 374 calculates various terms used in the control algorithms, including the input torque ti, the torque variable Tv, and the speed ratio No/Ni. Instruction block 376 determines the desired speed ratio, Rdes, in accordance with a number of inputs including throttle position, vehicle speed, and manual valve position.

In transmission control, this function is generally referred to as shift pattern generation. Instruction block 378 determines the clutching device pressure commands for effecting a ratio shift, if required. The pressure commands for the pressure regulator valve PRV and nonshifting clutching devices are also determined.

An expanded description of the instruction block 378 is set forth below in reference to the flow diagrams of FIGS. 8-10. Instruction block 380 converts the clutching device and PRV pressure commands to a PWM duty cycle based on the operating characteristics of the various actuators (empirically determined), and energizes the actuator coils accordingly. Instruction block 382 relates to the determination of adaptive corrections for the empirically derived clutch pressure schedules, and is discussed in more detail below in reference to FIGS. 11-12. Instruction block 384 relates to the determination of adaptive corrections for the empirically derived clutch fill times, as set forth for example in the U.S. Pat. No. 4,707,789 to Downs et al., issued Nov. 17, 1987, and assigned to General Motors Corporation. Instruction block 386 pertains to the development of the spark retard signal for EST unit 20 of FIG. 1a. This routine, although not critical to the subject invention, is set forth in detail in the flow diagram of FIG. 13.

Figure 8:
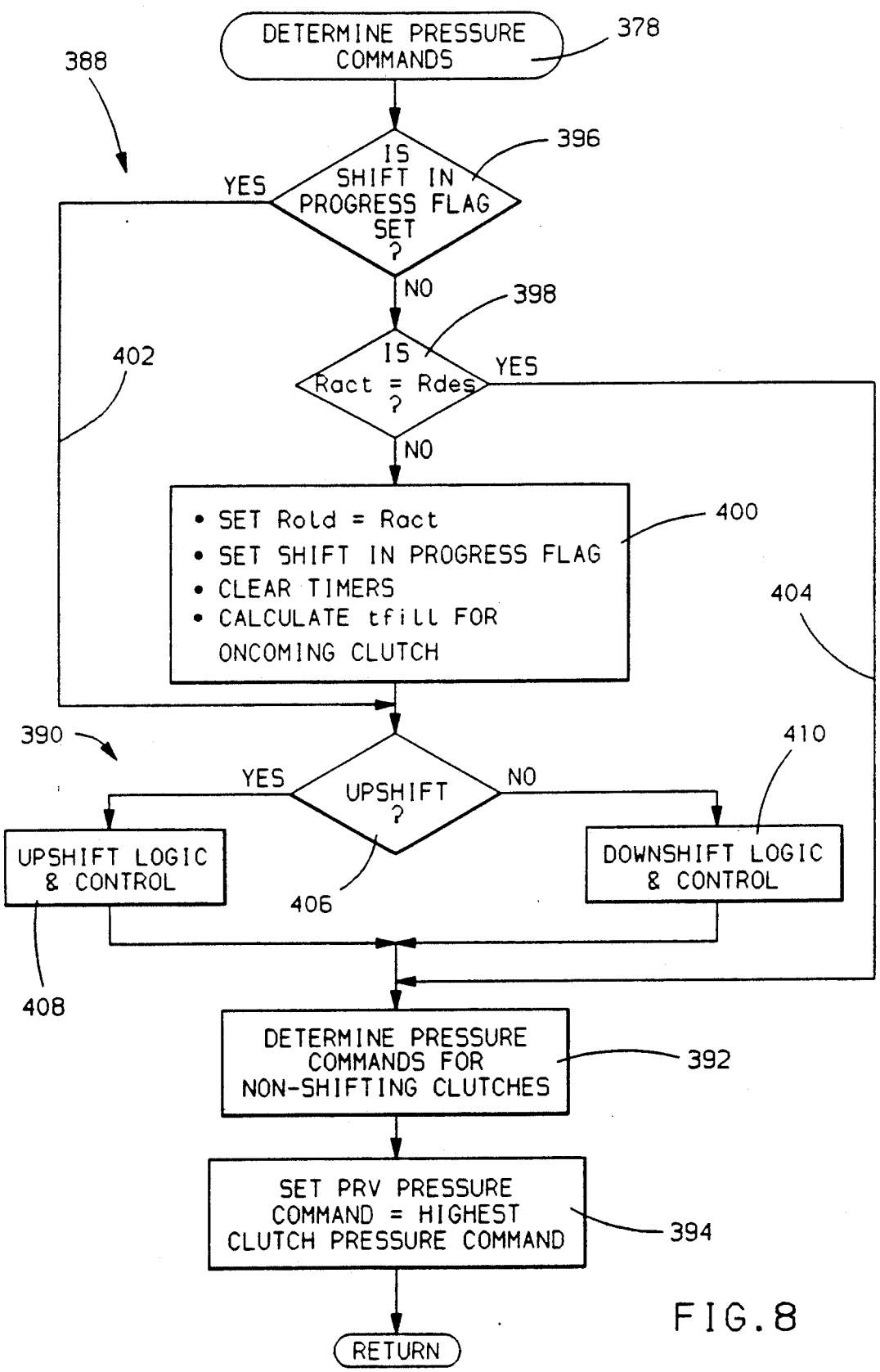
Figure 9:
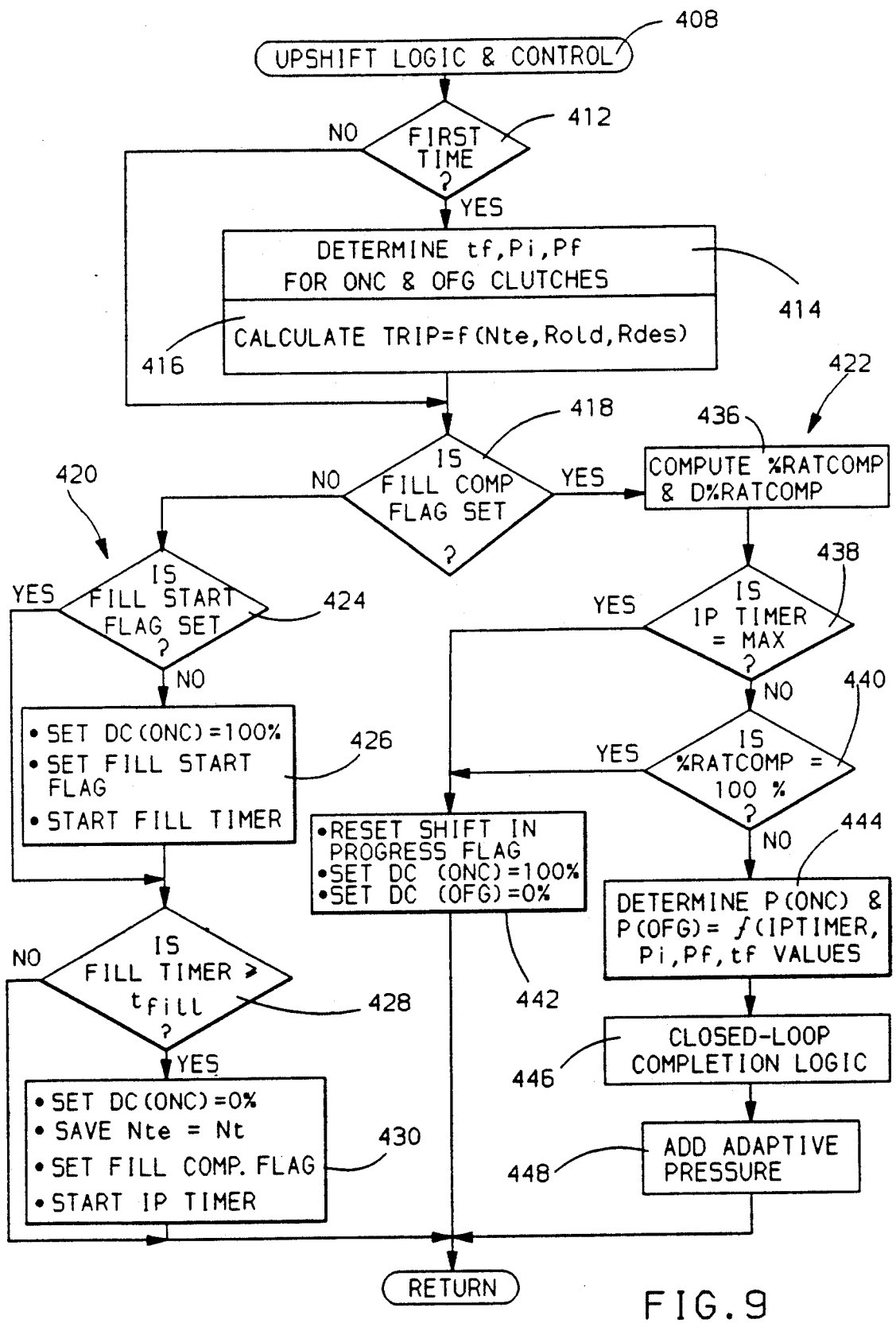
Figure 10:
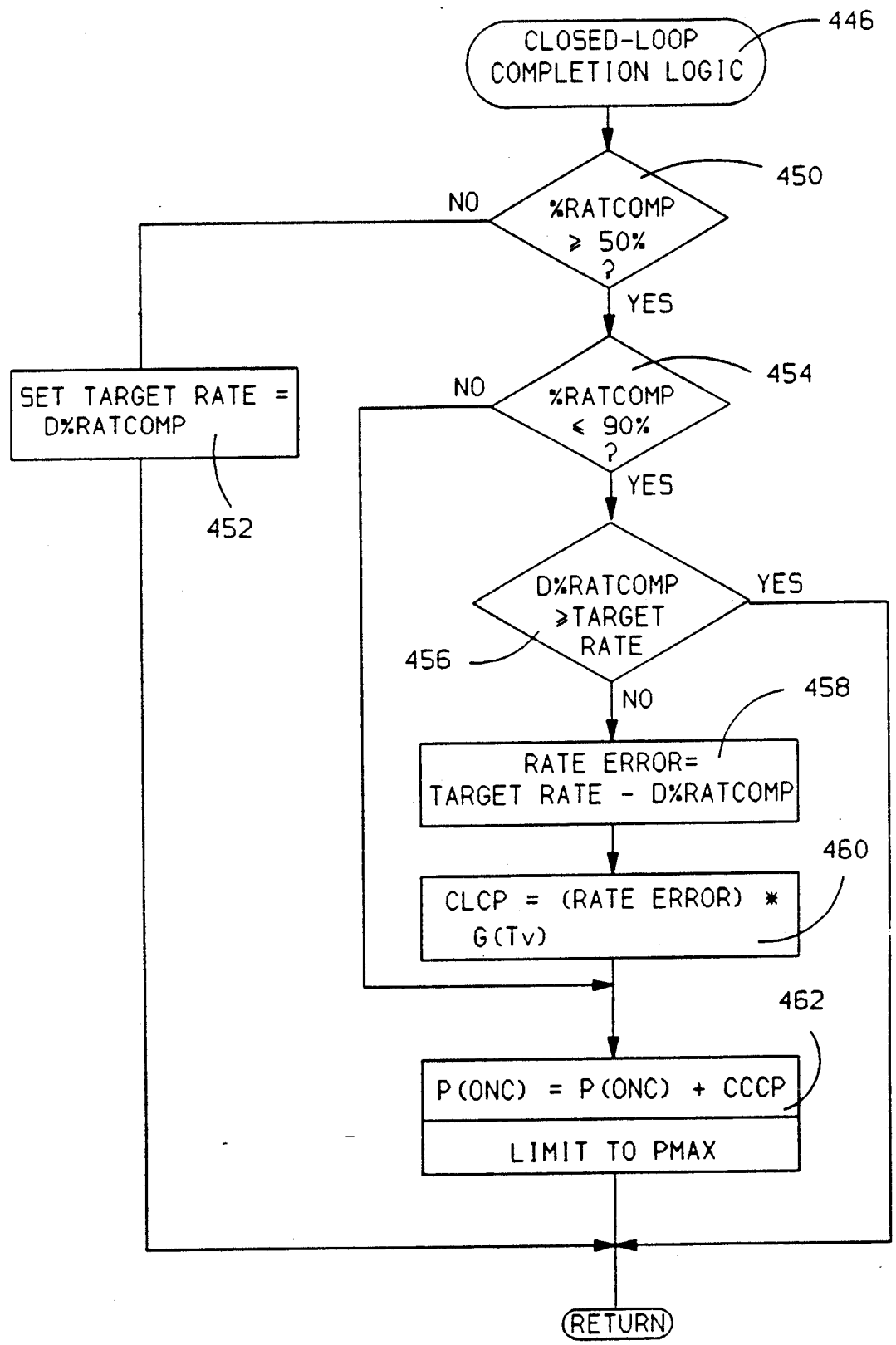

As indicated above, the flow diagrams of FIGS. 8-10 set forth the clutch and PRV pressure determination algorithm generally referred to at the main loop instruction block 378 of FIG. 7. Referring to FIG. 8, the blocks designated generally by the reference numeral 388 are first executed to set up initial conditions if a shift is desired. If a shift is desired, the blocks designated generally by the reference numeral 390 are executed to develop pressure commands for the clutching devices involved in the shift. Thereafter, the instruction blocks 392 and 394 are executed to develop pressure commands for the nonshifting clutches and the pressure regulator valve PRV, completing the routine. As indicated at instruction block 394, the pressure command for the regulator valve PRV is set equal to the highest of the pressure commands for the various clutching devices.

The blocks designated by the reference numeral 388 include the decision block 396 for determining if a shift is in progress as indicated by the "SHIFT IN PROGRESS" flag; the decision block 398 for determining if the actual speed ratio Ract (that is, No./Nt) is equal to the desired speed ratio Rdes determined at instruction block 376 of FIG. 7; and the instruction block 400 for setting up the initial conditions for a ratio shift. The instruction block 400 is only executed when decision blocks 396 and 398 are both answered in the negative.

In such case, instruction block 400 serves to set the old ratio variable, Rold, equal to Ract, to set the "SHIFT IN PROGRESS" flag, clear the shift timers, and to calculate the fill time tfill for the on-coming clutching device. If a shift is in progress, the execution of blocks 398 and 400 is skipped, as indicated by the flow diagram line 402. If no shift is in progress, and the actual ratio equals the desired ratio, the execution of instruction block 400 and the blocks designated by the reference numeral 390 is skipped, as indicated by the flow diagram line 404.

The blocks designated by the reference numeral 390 include the decision block 406 for determining if the shift is an upshift or a downshift; the instruction block 408 for developing pressure commands for the active (shifting) clutching devices if the shift is an upshift; and the instruction block 410 for developing the pressure commands for the active clutching devices if the shift is a downshift. To illustrate how such pressure commands are developed, the steps involved in the development of a typical power-on upshift (i.e., instruction block 408) are set forth in the flow diagram of FIG. 9.

On entering the flow diagram of FIG. 9, the control unit executes a shift initializing routine comprising the blocks 412-416. In the first execution of the routine in a given shift, determined by the decision block 412, the instruction blocks 414 and 416 are executed to determine the pressure parameters Pi, Pf and tf for the on-coming (ONC) and off-going (OFG) clutching devices, and to calculate the reference inertia phase interval Trip as a function of Nte, Rold and Rdes. In subsequent executions of the routine, decision block 412 is answered in the negative.

Decision block 418 is then executed to determine if the fill phase of the shift is completed, as indicated by the "FILL COMP" flag. If not, the flow diagram branch, generally designated by the reference numeral 420, is executed; if so, the flow diagram branch, generally designated by the reference numeral 422, is executed.

The flow diagram branch 420 includes a fill initializing routine comprising the blocks 424 and 426 and a fill completion routine comprising the blocks 428 and 430. At the beginning of each shift, the "FILL COMP" flag is not set, and the decision block 424 of the fill initializing routine is executed to determine if the fill phase has started, as indicated by the "FILL START" flag.

Initially, the "FILL START" flag is not set, and instruction block 426 is executed to set the energization duty cycle of the on-coming clutching device, DC(ONC), equal to 100%, to set the "FILL START" flag, and to start a FILL TIMER. Thereafter, decision block 424 is answered in the affirmative, and executing of instruction block 426 is skipped. Decision block 428 of the fill completion routine determines if the count in FILL TIMER is greater than or equal to the fill time tfill determined at instruction block 400 of FIG. 11. If so, instruction block 430 is executed to save the entry turbine speed Nte, to set the "FILL COMP" flag, and to start the inertia phase timer, IP TIMER. If decision block 428 is answered in the negative, the fill phase is incomplete, and execution of the instruction block 430 is skipped.

After the fill period has elapsed and decision block 418 is answered in the affirmative, the flow diagram branch 422 is executed to complete the shift. First, the instruction block 436 is executed to calculate the value of %RATCOMP, and also, the ratio of change of %RATCOMP, designed D%RATCOMP. Then the decision blocks 438 and 440 are executed to determine if the count in IP TIMER is at a maximum value, MAX, or if the term %RATCOMP is substantially equal to 100%.

If either of the decision blocks 438 or 440 are answered in the affirmative, the shaft is complete and instruction block 442 is executed to reset the "SHIFT IN PROGRESS" flag, to set the on-coming duty cycle, DC(ONC), equal to 100%, and to set the off-going duty cycle, DC(OFG), equal to 0%. If both decision blocks 438 and 440 are answered in the negative, instruction blocks 444-448 are executed to determine the on-coming and off-going pressure commmands, P(ONC) and P(OFG). The instruction block 444 determines the base pressure commands as a function of the Pi, Pf, tf, and IP TIMER values determined at instruction block 414. The instruction block 446 pertains to the closed-loop shift completion logic of this invention, and is set forth in further detail in the flow diagram of FIG. 10. The instruction block 448 pertains to the adaptive correction of the scheduled on-coming pressure, and is set forth in further detail in the flow diagrams of FIGS. 11 and 12, respectively.

Referring to the closed-loop shift completion logic of FIG. 10, the decision block 450 is first executed to determine if the ratio completion term %RATCOMP has exceeded 50%. Until block 450 is answered in the affirmative, the block 452 is periodically executed to update a TARGET RATE term in accordance with the current rate of change of shift progression, D%RATCOMP. Thereafter, and until %RATCOMP reaches approximately 90%, as determined at block 454, the blocks 456-462 are executed to determine a closed-loop adjustment to the scheduled on-coming pressure if necessary (blocks 456-460), and to apply the adjustment to the commanded on-coming pressure (block 462). If the computed rate of change of shift progression D%RATCOMP is at least as great as the TARGET RATE, as determined at block 456, the remainder of the routine is skipped, and no adjustment is made to the scheduled on-coming pressure.

If D%RATCOMP is less than the TARGET RATE, blocks 458 and 460 are executed to compute the RATE ERROR according to the deviation, and to determine a closed-loop completion pressure term, CLCP, according to the product of RATE ERROR and a gain term G(Tv). As indicated at block 460, the gain term G(Tv) is scheduled as a function of the torque variable Tv used to schedule the shift to provide increased gain with increasing input torque. As indicated at block 462, and as illustrated in Graph A of FIG. 6, the adjusted on-coming pressure P(ONC) is limited at the line pressure Pmax. Once the term %RATCOMP exceeds 90%, the execution of blocks 456-460 is skipped, and no further adjustment is made to the on-coming pressure.

Figure 11:
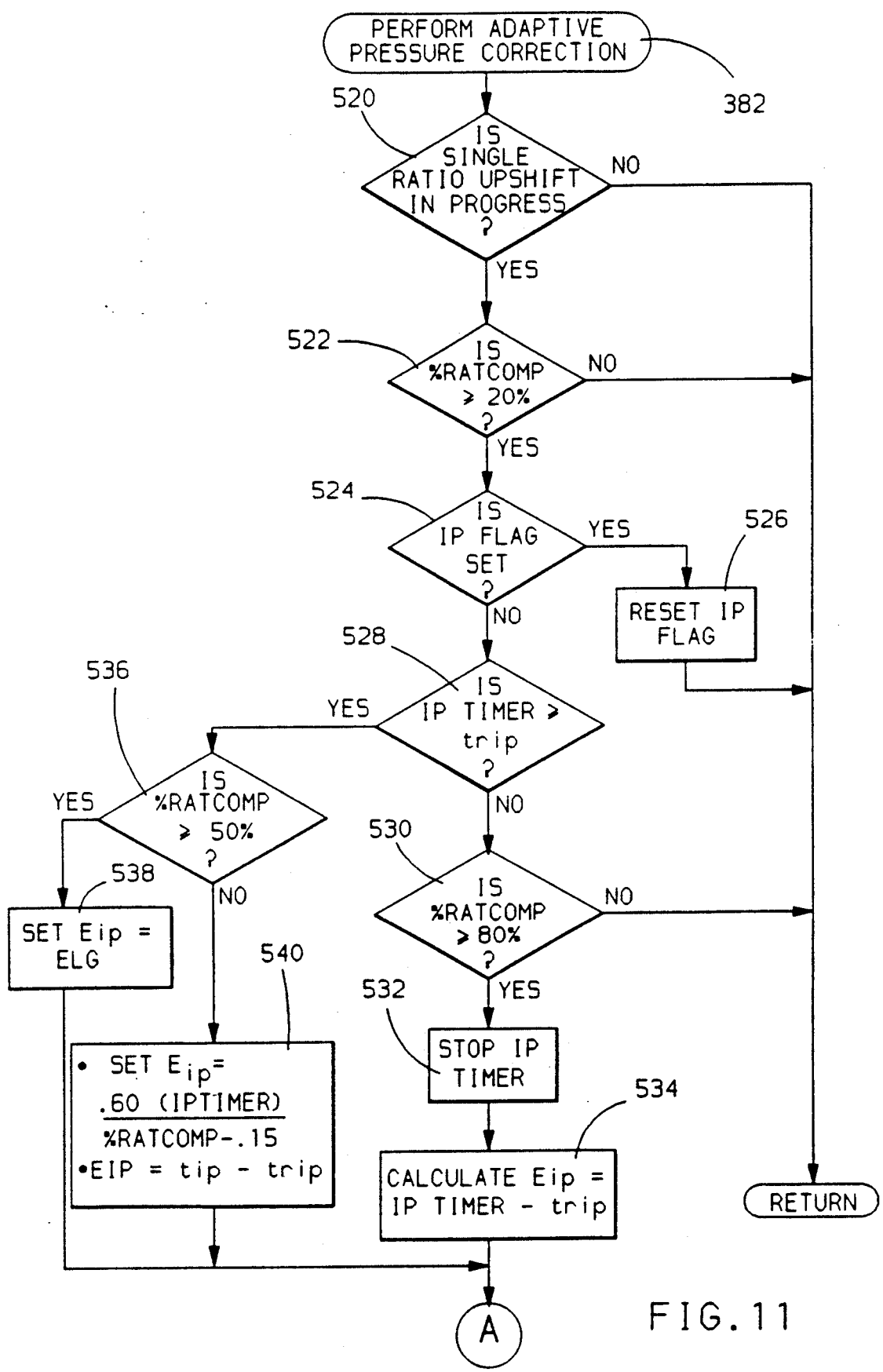
Figure 12:
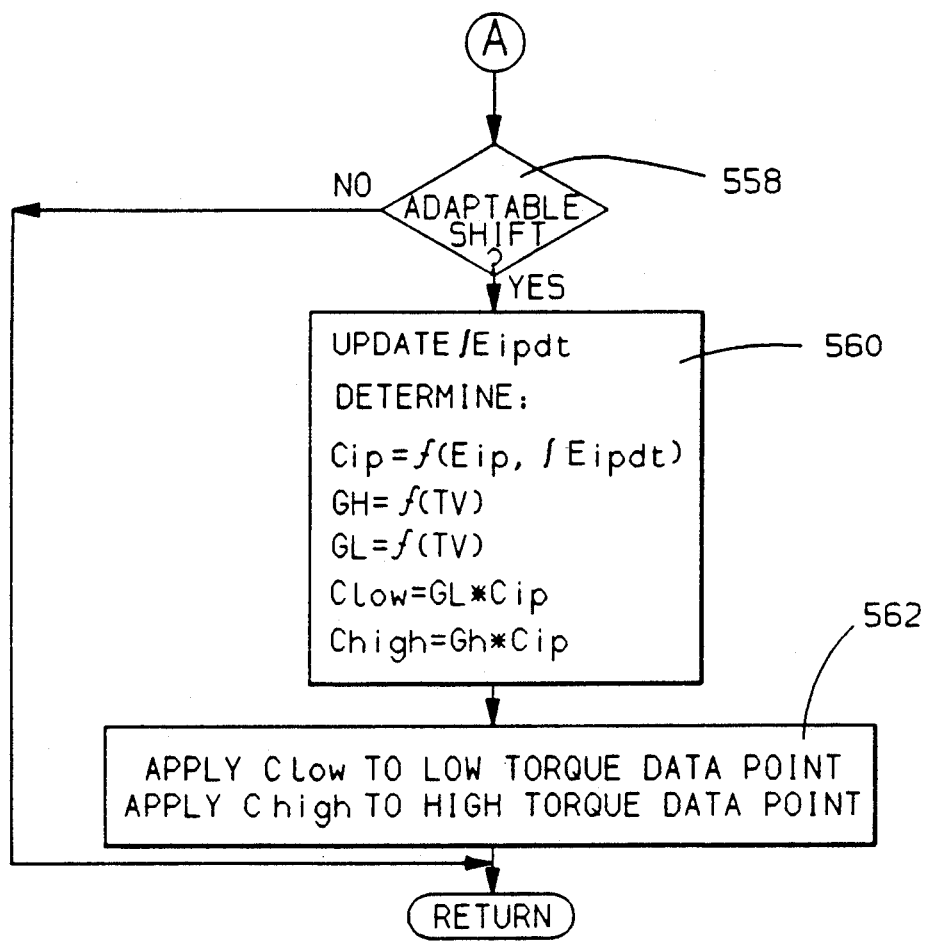

The flow diagram of FIGS. 11-12 details the adaptive pressure correction routine referenced by the main flow diagram instruction block 382 of FIG. 7. The routine comprises the steps of obtaining a measure Tip of the inertia phase interval, comparing Tip to a reference interval Trip to obtain an inertia phase error term Eip, and developing an adaptive correction amount in relation to Eip and the time integral of Eip. The measured interval begins when the ratio shift is 15% complete and ends when the ratio shift is 85% complete, as judged by the term %RATCOMP. The routine includes an initializing portion, an interval measurement portion, and a correction portion. The initializing portion comprises the blocks 520-526; the interval measurement portion comprises the blocks 528-540; and the correction portion comprises the blocks 542-562.

In the initializing portion of the routine, the decision blocks 520 and 522 are executed to determine if a single ratio upshift is in progress, and if the ratio shift is at least 15% complete, as judged by the term, %RATCOMP. If either of the decision blocks 520 and 522 are answered in the negative, the remainder of the flow diagram is skipped, as indicated by the flow diagram return line 550. When both are answered in the affirmative, the decision block 524 is executed to determine if the IP flag is set. This flag marks the beginning of the measured inertia phase interval, and is set by the instruction block 526 the first time that decision block 524 is executed. Thereafter, instruction block 524 is answered in the negative, and the measurement portion of the routine is entered.

In the measurement portion of the routine, the decision block 528 is executed to compare the count in the IP TIMER with the reference interval, trip. So long as the count in IP TIMER is less than trip, the blocks 530–534 are executed to stop IP TIMER at 85% completion and to calculate the inertia phase error Eip according to the difference (IP TIMER - trip). However, when the count in IP TIMER exceeds trip, the blocks 536–540 are executed to either (1) set the error Eip at a predetermined large value, ELG, if the shift is less than 50% complete, or (2) compute the error Eip in relation to the difference between Trip and a linear extrapolation of the inertia phase time, tip. In the later case, the time tip is extrapolated from the current values of IP TIMER and %RAT, as indicated at instruction block 540 by the expression:

$$Tip = (IPTIMER*0.70)/(\%RATCOMP - 0.15)$$

In the correction portion of the routine (FIG. 12), the decision block 558 is first executed to determine if the various parameters monitored in the course of the shift are indicative of an adaptable shift. Such parameters may include stable throttle position, positive torque, and satisfactory oil temperature throughout the shift. If decision block 558 is answered in the affirmative, an adaptive pressure correction may be reliably made and the instruction blocks 560 and 562 are executed to update the low and high torque data points of the designated correction table in relation to the error Eip and the time integral of Eip.

The instruction block 560 updates the time integral of Eip and calculates a number of terms including the inertia phase pressure correction Cip, the gain factors GH and GL, and the actual data point correction amounts Chigh and Clow. Instruction block 562 then applies the data point correction amounts Chigh and Clow to the high and low torque data points of the designated table.

The correction amount Cip is determined as a function of Eip and the time integral of Eip, and the gain factors GL and GH are determined as a function of the torque variable Tv as described in the above-referenced Downs et al. patent. The respective gain factors are multiplied by the correction amount Cip to determine the data point correction amounts Chigh and Clow. In future shifts, the pressure supplied to the subject clutching device will result in an inertia phase interval more nearly equal to the reference interval trip, and a more nearly optimum quality shift.

Figure 13:
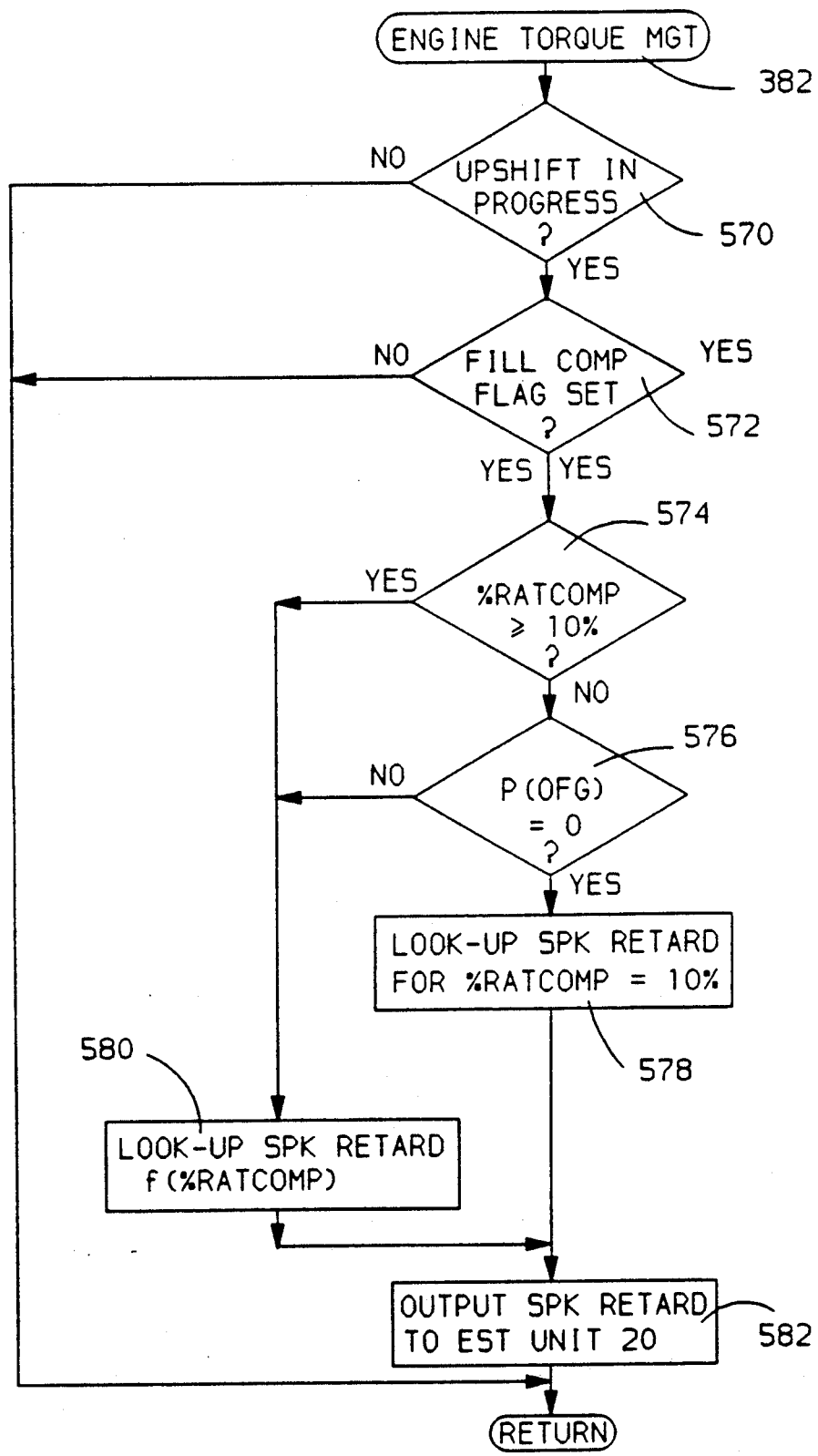

Referring to the Engine Torque Management routine of FIG. 13, the decision blocks 570 and 572 define entry conditions to the spark retard control. If an upshift is in progress (decision block 570) and the fill phase of the upshift is complete (decision block 572), the blocks 574–582 are executed to look-up and output on line 21 a spark retard value for producing the scheduled amount of engine torque loss. The spark retard look-up may be effected with an empirically determined table of spark retard vs. % engine torque loss, substantially as set forth in the U.S. Pat. No. to Marsh et al. 4,809,660, issued March 7, 1989, and assigned to General Motors Corporation. If the ratio completion term %RATCOMP is less than 10% (decision block 574) and the off-going pressure P(OFG) is fully released (decision block 576), the block 578 is executed to initialize the spark retard at 50% engine torque loss. This is achieved by using a look-up table based on FIG. 4, described above.

When the ratio completion term %RATCOMP exceeds 10% (decision block 574) the block 580 is executed to determine the spark retard as a function of the ratio completion term %RATCOMP per FIG. 4. Of course, the specific spark retard routine is not critical to the closed-loop pressure control of the present invention, and is only described to illustrate the preferred embodiment.

While this invention has been described in reference to the illustrated embodiment, it will be understood that various modifications will occur to those skilled in the art, and that systems incorporating such modifications may fall within the scope of this invention which is defined by the appended claims.

The embodiments of the invention in which an exclusive property or privilege is claimed are defined as follow:

1. In a motor vehicle having an engine connected to supply torque to a multiple speed ratio transmission, the transmission being upshifted from a first speed ratio to a second speed ratio by supplying fluid pressure to an on-coming torque transmitting device in accordance with a predetermined pressure schedule based on an estimation of the torque supplied to said transmission by said engine upon initiation of said upshift, said predetermined schedule being adaptively adjusted based on a measured interval of speed ratio progression during said shift, a method of operation comprising the steps of:

measuring a rate of change of speed ratio progression during said upshift;

establishing a target rate of change of speed ratio progression based on the rate of change of speed ratio progression measured during a first portion of said upshift, such target rate being dependent on the torque transmitted by said on-coming torque transmitting device;

comparing said target rate to the rate of change of speed ratio progression measured during a second portion of said upshift subsequent to said first portion; and adjusting the fluid pressure supplied to said on-coming torque transmitting device during said second portion of said upshift based on said comparison so as to maintain the target rate of change of speed ratio progression during such second portion, thereby compensating for engine torque changes during such second portion which would otherwise tend to affect said measured interval of speed ratio progression.

2. In a motor vehicle having an engine connected to supply torque to a multiple speed ratio transmission, the transmission being upshifted from a first speed ratio to a second speed ratio by supplying fluid pressure to an on-coming torque transmitting device in accordance with a predetermined pressure schedule based on an estimation of the torque supplied to said transmission by said engine upon initiation of said upshift, said predetermined schedule being adaptively adjusted based on a measured interval of speed ratio progression during said shift, a method of operation comprising the steps of:

measuring a rate of change of speed ratio progression during said upshift;

establishing a target rate of change of speed ratio progression based on the rate of change of speed ratio progression measured during a first portion of said upshift, such target rate being dependent on the torque transmitted by said on-coming torque transmitting device;

determining a rate error based on the amount by which said target rate exceeds the rate of change of speed ratio progression measured during a second portion of said upshift; and increasing the fluid pressure supplied to said on-coming torque transmitting device during said second portion of said upshift in relation to said rate error.

3. The method of operation set forth in claim 2, wherein the step of increasing the fluid pressure supplied to said on-coming torque transmitting device during said second portion of said upshift includes the steps of:

determining a gain factor in relation to said estimation of the torque supplied to said transmission by said engine upon initiation of said upshift; and increasing the fluid pressure supplied to said on-coming torque transmitting device in relation to the product of said rate error and said gain factor.

* * * * *